(12) United States Patent
Kowalczyk et al.

(10) Patent No.: US 8,873,922 B2
(45) Date of Patent: Oct. 28, 2014

(54) FAN-OUT AND PARKING MODULE

(75) Inventors: Scott C. Kowalczyk, Savage, MN (US); Joshua M. Simer, Chaska, MN (US); Jerad D. Whitaker, Richfield, MN (US); Oscar Fernando Bran de León, Belle Plaine, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 496 days.

(21) Appl. No.: 13/331,591

(22) Filed: Dec. 20, 2011

(65) Prior Publication Data

US 2012/0189260 A1  Jul. 26, 2012

Related U.S. Application Data

(60) Provisional application No. 61/425,140, filed on Dec. 20, 2010.

(51) Int. Cl.
  *G02B 6/00* (2006.01)
  *G02B 6/44* (2006.01)
(52) U.S. Cl.
  CPC ........................................ *G02B 6/44* (2013.01)
  USPC .......................................... 385/135; 385/137
(58) Field of Classification Search
  USPC ................................................. 385/135, 137
  See application file for complete search history.

(56) References Cited

U.S. PATENT DOCUMENTS

| | | | |
|---|---|---|---|
| 7,198,409 B2 | 4/2007 | Smith et al. | |
| 7,233,731 B2 | 6/2007 | Solheid et al. | |
| 7,264,402 B2 | 9/2007 | Theuerkorn et al. | |
| 7,277,620 B2 | 10/2007 | Vongseng et al. | |
| 7,369,741 B2 * | 5/2008 | Reagan et al. | 385/139 |
| 7,397,997 B2 | 7/2008 | Ferris et al. | |
| 7,509,016 B2 | 3/2009 | Smith et al. | |
| 7,512,304 B2 | 3/2009 | Gronvall et al. | |
| 7,715,679 B2 | 5/2010 | Kowalczyk et al. | |
| 7,756,379 B2 | 7/2010 | Kowalczyk et al. | |
| 8,538,228 B2 * | 9/2013 | Smith et al. | 385/135 |
| 8,649,649 B2 * | 2/2014 | Smith et al. | 385/136 |
| 2011/0222829 A1 | 9/2011 | Loeffelholz et al. | |
| 2013/0177284 A1 * | 7/2013 | Sievers et al. | 385/135 |

* cited by examiner

*Primary Examiner* — Sung Pak

(74) *Attorney, Agent, or Firm* — Merchant & Gould P.C.

(57) ABSTRACT

The present disclosure relates to a telecommunications apparatus that includes a fan-out module main body adapted for connection to a rack. The telecommunications apparatus also includes a fan-out block attached to the fan-out module main body. The telecommunications apparatus also includes a multi-fiber cable segment. The multi-fiber cable segment includes first and second strength members. The first and second strength members are anchored to the fan-out block. The telecommunications apparatus further includes a plurality of pigtail cable segments each including a jacket containing one of the optical fibers and a plurality of flexible strength members positioned inside the jacket. The flexible strength members of the pigtail cable segments are anchored to the fan-out block, the optical fibers being fanned out from the multi-fiber cable segment to the pigtail cable segments within the fan-out block. The telecommunications apparatus also includes a plurality of single fiber connectors mounted to free ends of the pigtail cable segments.

13 Claims, 14 Drawing Sheets

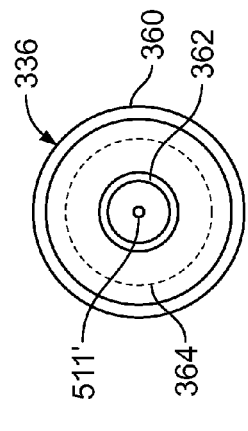
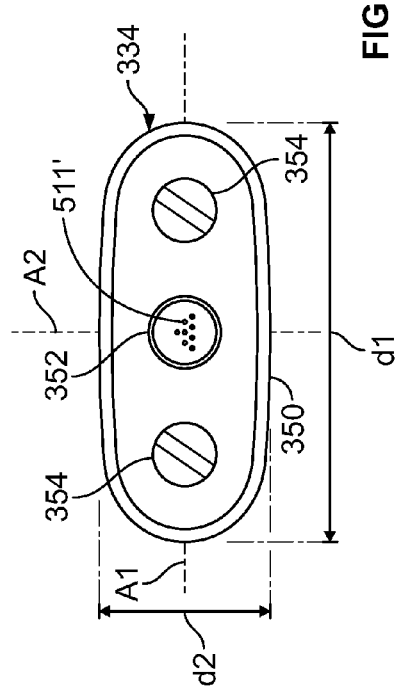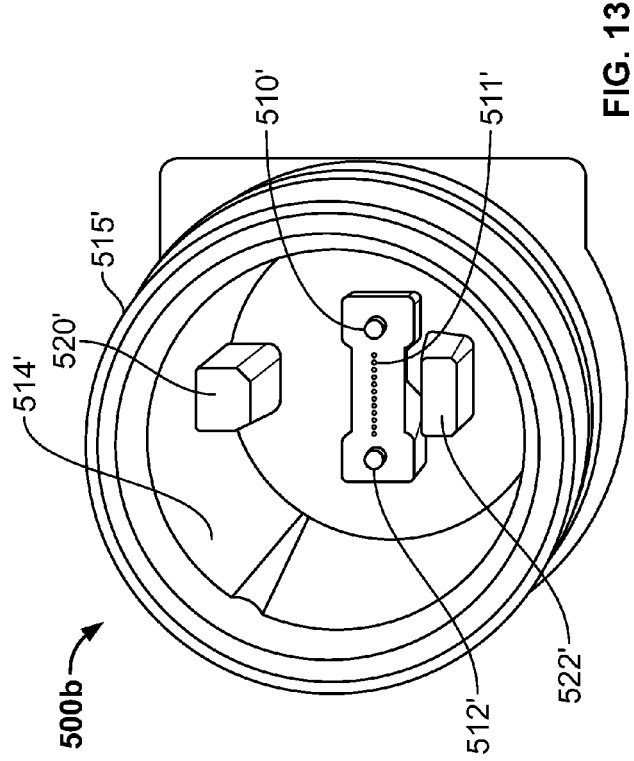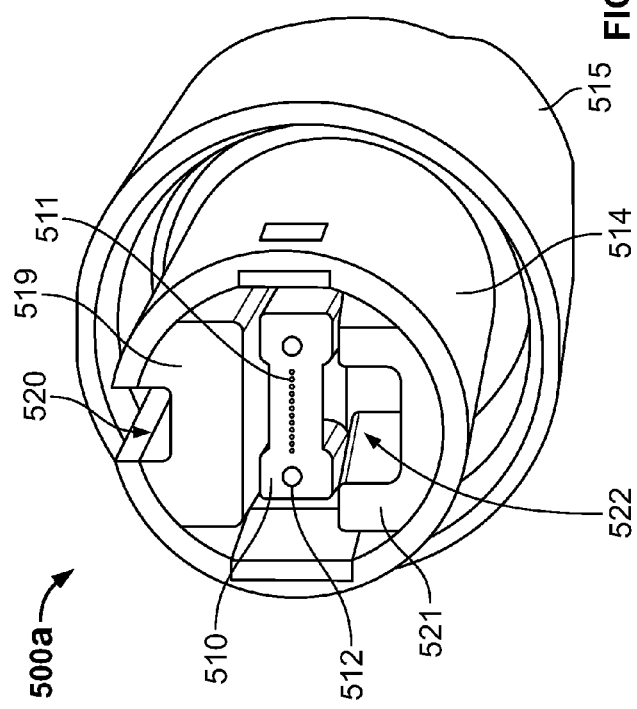

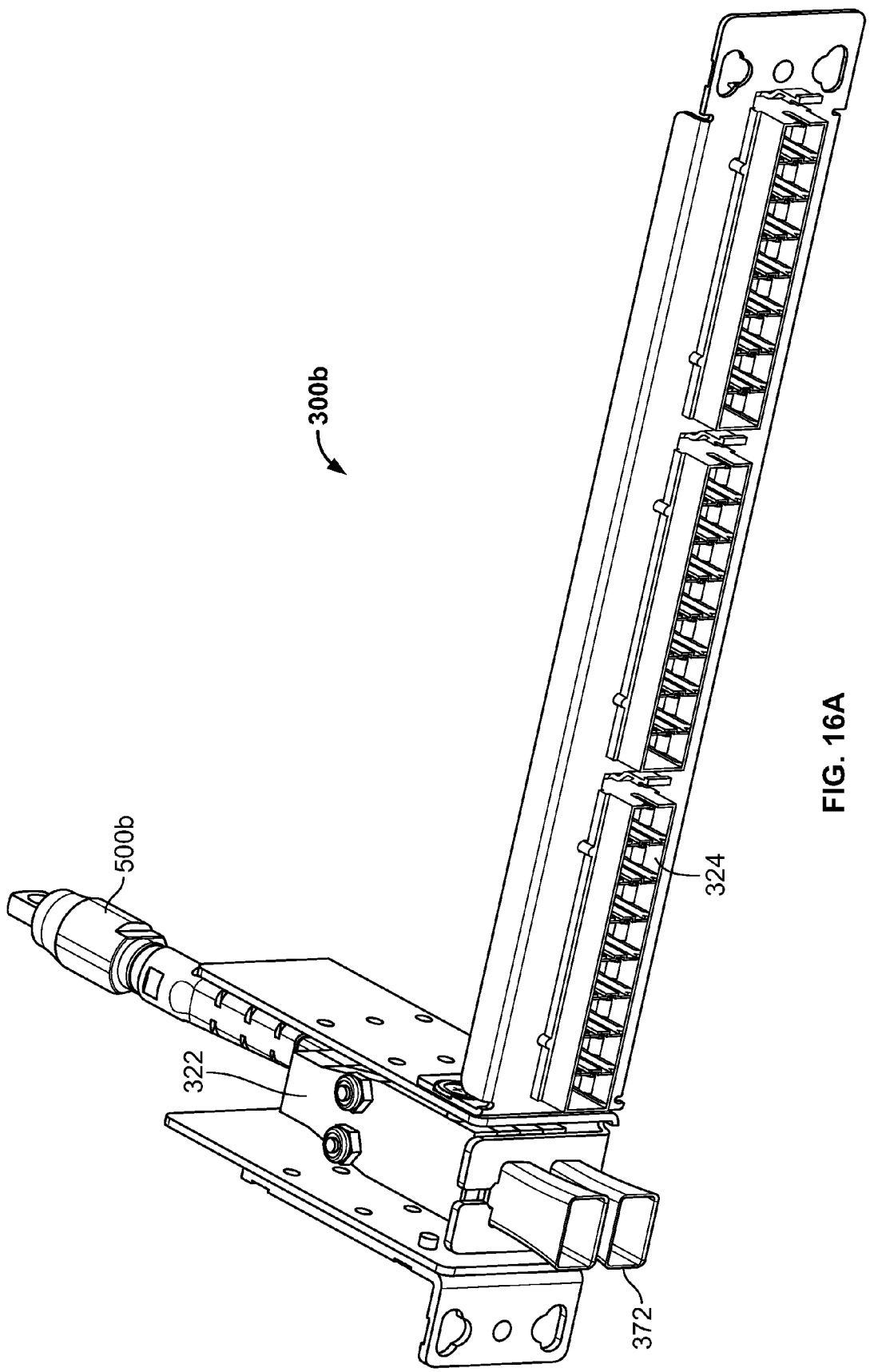

FAN-OUT AND PARKING MODULE

CROSS-REFERENCE TO RELATED APPLICATION

The present application claims the benefit of U.S. Provisional Patent Application Ser. No. 61/425,140, filed Dec. 20, 2010, which application is hereby incorporated by reference in its entirety.

BACKGROUND

A goal of service providers in the telecommunications industry is to deliver high bandwidth communication capabilities to customers in a cost effective manner. In general, improvements relating to systems for managing cables and providing connections between cables/telecommunications equipment assist service providers in achieving this goal.

SUMMARY

Certain aspects of the disclosure relate to telecommunication equipment and arrangements that enhance cable management, ease of use, and scalability. Aspects of the present disclosure can be used in fiber-to-the-cell-tower applications as well as other FTTX applications (e.g., fiber-to-the-premises, fiber-to-the-node, etc.).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DRAWINGS

FIG. 10 is a cross-sectional view taken along section line 10-10 of FIG. 4;

FIG. 11 is cross-sectional view taken along section line 11-11 of FIG. 4;

FIGS. 12 and 13 show ruggedized multi-fiber optic connectors that can be used in systems in accordance with the principles of the present disclosure;

FIGS. 16A and 16B show an another fan-out and parking module in accordance with the principles of the present disclosure;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
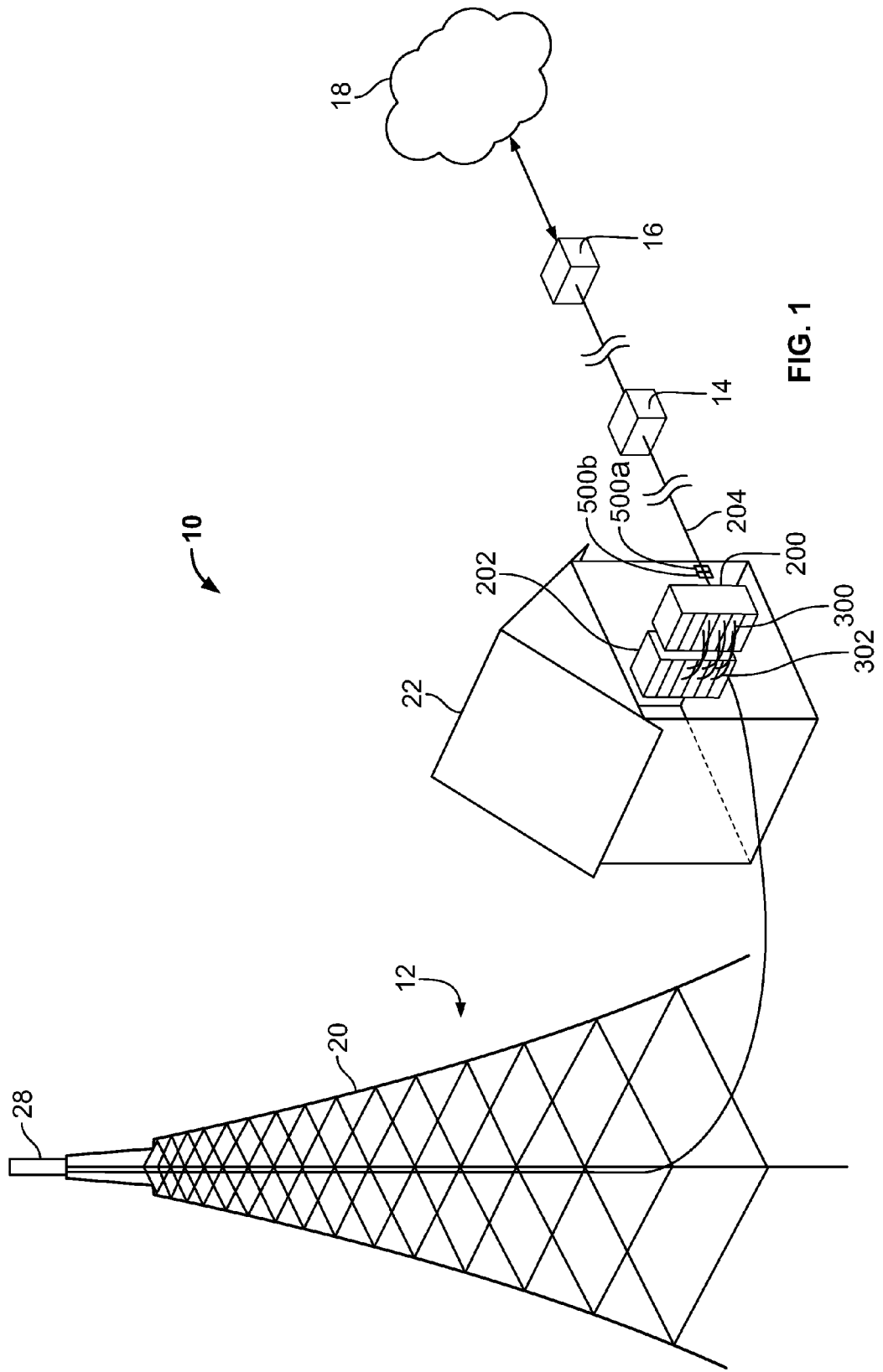
FIG. 1 is a schematic representation of a telecommunications network having exemplary features of aspects in accordance with the principles of the present disclosure.

Referring now to FIG. 1, a schematic representation of a telecommunications network 10 is shown. In the depicted embodiment, the telecommunications network 10 is a cellular network 10. The cellular network 10 includes a cell site 12, a demarcation point 14 (e.g., a splice vault), a backhaul 16 and a core network 18.

The cell site 12 creates an area of telecommunications coverage (i.e., a cell) in the cellular network 10. In one embodiment, the cell site 12 includes a cell tower or mast 20 and a but 22 enclosing telecommunications equipment that is in communication with the tower 20. For example, the but 22 can enclose active equipment (e.g., multiplexing devices, de-multiplexing devices, routers, optical-to-digital converters, etc.) that connects to remote transceivers 28 (e.g., remote radio heads) mounted on the cell tower 20. The remote transceivers 28 are adapted to transmit and receive signals to and from devices (e.g., mobile phones, smart-phones, devices with wireless internet connectivity, etc.) of subscribers to the cellular network 10. In one embodiment, the tower 20 may include an antenna or antennas. The remote transceivers 28 may be integrated into the antenna or antennas.

Figure 5:
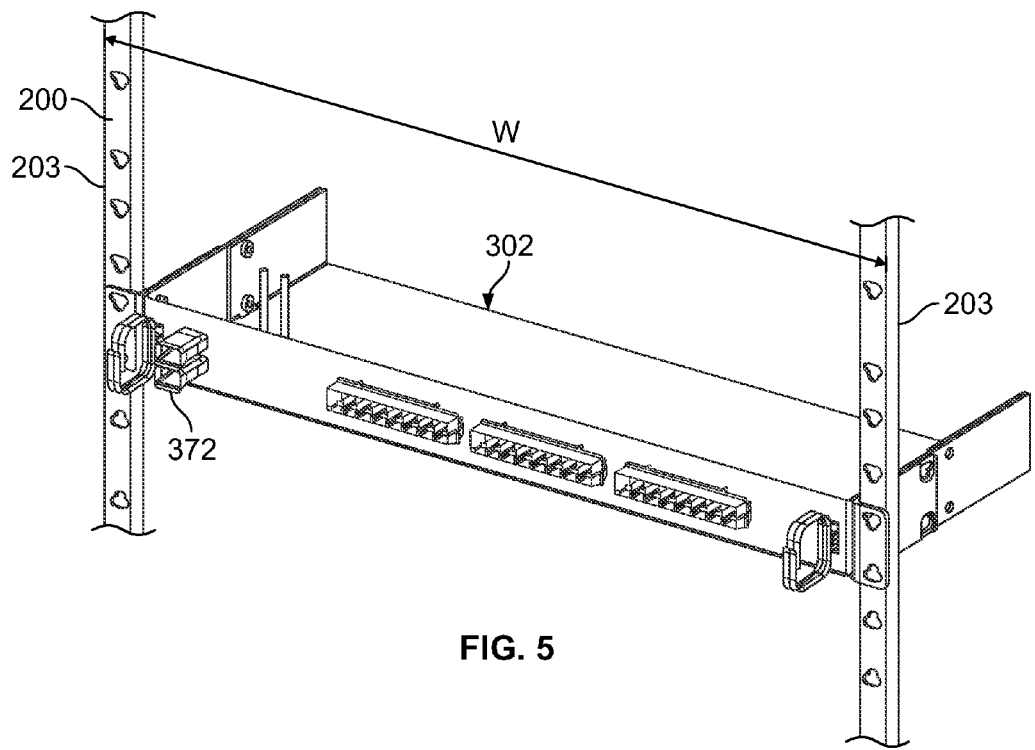
FIG. 5 is a front perspective view of the fan-out and parking module of FIG. 2 with the fiber optic cable assembly removed.
Figure 6:
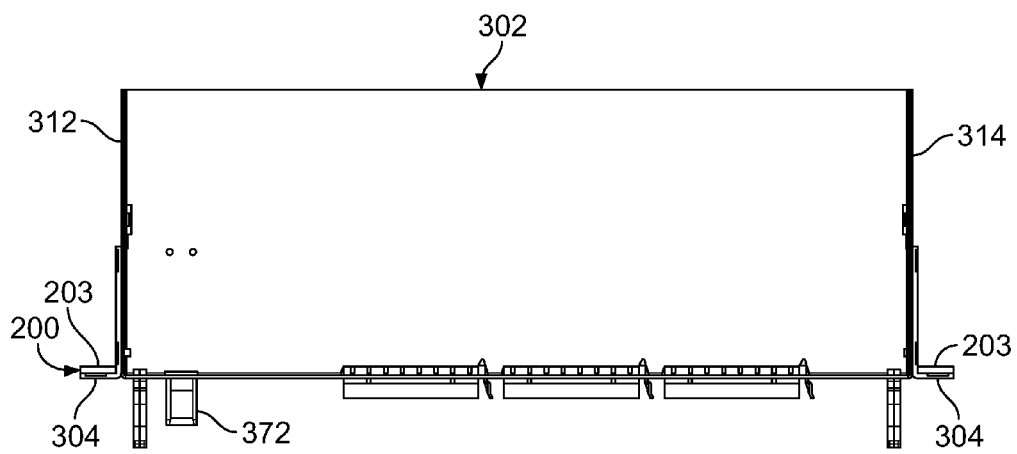
FIG. 6 is a top view of the fan-out and parking module of FIG. 5.
Figure 7:
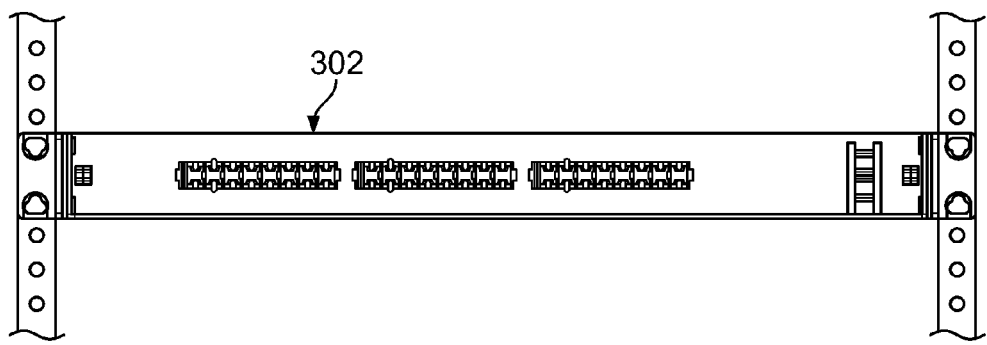
FIG. 7 is a rear view of the fan-out and parking module of FIG. 6.
Figure 8:
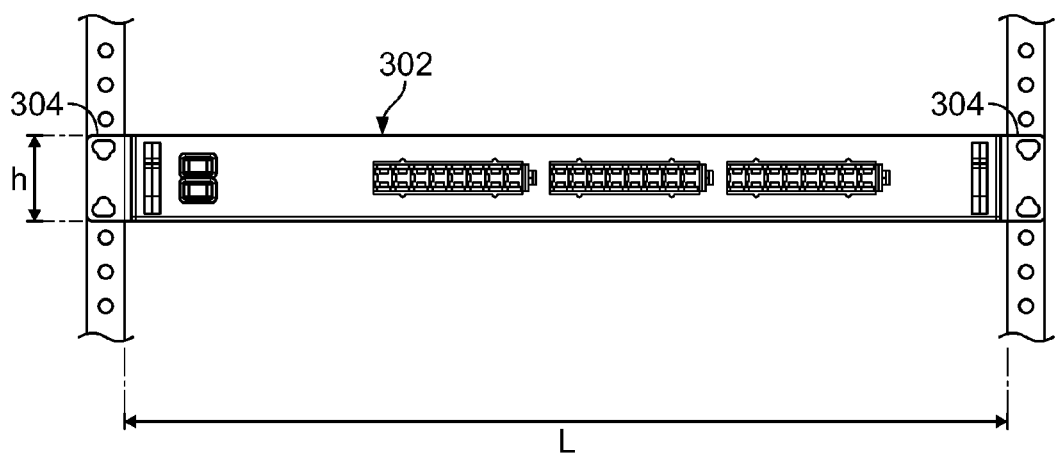
FIG. 8 is a front view of the fan-out and parking module of FIG. 6.
Figure 9:
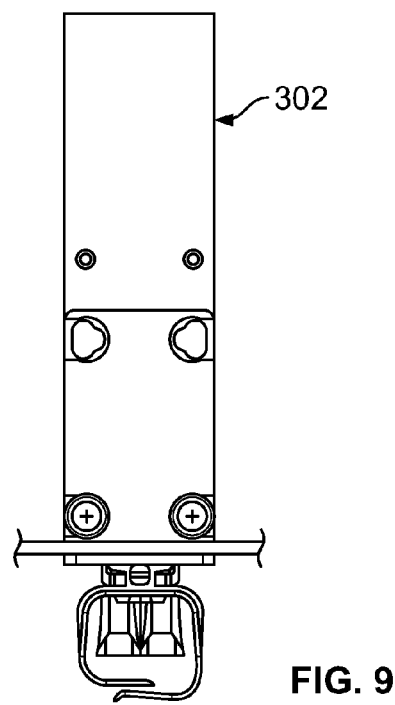
FIG. 9 is a side view of the fan-out and parking module of FIG. 6.

Referring to FIG. 1, the but 22 is shown housing an equipment mounting rack 200 and an equipment cabinet 202. The active equipment cabinet 202 can house active equipment such as multiplexing devices, de-multiplexing devices, routers, optical-to-digital converters. The equipment in the cabinet 202 connects to the remote transceivers 28. The equipment mounting rack 200 provides a location for mounting equipment 300 adapted to interface with cables 204 routed from the demarcation point 14 to the but 22. In certain embodiments, the rack 200 can include a frame having different widths W (e.g., a "19 inch" rack typically has an 18.31 center-to-center spacing between fastener openings and a "24 inch" typically has a 22.31 inch center-to-center spacing between fastener openings). The frame can include spaced-apart vertical mounting rails 203 (see FIGS. 5 and 6) defining the fastener openings for mounting equipment to the rack. In one embodiment, the cables 204 can include multi-fiber cables each including a jacket enclosing a plurality of optical fibers. In one embodiment, the cables 204 can be terminated by ruggedized multi-fiber connectors 500a. The equipment 300 mounted to the rack 200 can include ruggedized multi-fiber connectors 500b that interconnect with the ruggedized multi-fiber connectors 500a. The equipment 300 can also include fan-out devices and a plurality of fiber optic cords 302 (e.g., patch cords, connectorized pigtails, etc.) that extend from the rack 200 to the cabinet 202.

In operation of the network, signals are transmitted from the core network 18 through the backhaul 16 to the demarcation point 14. From the demarcation point 14, the signals are transmitted through the cables 204 to the equipment 300 at the rack 200. The fiber optic cords 302 carry the signals from the rack 200 to the equipment in the cabinet 202. The signals are then directed from the equipment in the cabinet 202 to the remote transceivers 28 which transmit the signals to subscribers of the cellular network. The transceivers 28 are also capable of receiving signals from the subscribers. The received signals are directed to the equipment of the cabinet 202. The fiber optic cords 302 carry the signals from the cabinet 202 to the equipment 300 at the rack 200. The cables 204 then carry the signals from the rack 200 to the demarcation point 14. The signals are subsequently carried through the backhaul 16 to the core network 18.

FIGS. 2-9 show a fan-out and parking module 300a that is an example of the type of equipment 300 that can be mounted on the rack 200. In the depicted embodiment, the fan-out and parking module 300a is be configured to occupy only one rack unit of the rack 200 and has a height h less than or equal to 1.75 inches. The fan-out and parking module 300a includes a module main body 302 which also can be referred to as a frame, support structure, member, or like terms. The module main body 302 is secured to the rack 200 by universal brackets 304 fastened to opposite ends 312, 314 of the module main body 302. Each of the universal brackets 304 includes a long leg 306 arranged perpendicularly relative to a short leg 308. Fastener openings 310 are defined by the long and short legs 306, 308. The fastener openings 310 are adapted to receive fasteners for attaching the legs 306, 308 to either the module main body 302 or the rails 203 of the rack 200. By attaching the long legs 306 to the module main body 302 as shown, the fan-out and parking module 300a can be connected to a standard 19 inch rack by fastening the short legs 308 to the rails 203. In contrast, the fan-out and parking module 300a can be attached to a standard 23 inch rack by attaching the short legs 308 to the module main body 302 and the long legs 306 to the rails 203 of the rack 200.

Referring still to FIGS. 2-9, the module main body 302 includes a front panel 316 having a length L that extends between the opposite ends 312, 314 of the module main body 302. When the fan-out and parking module 300a is mounted to the rack 200, the length L extends across the width W of the rack 200. The front panel 316 has a front side 318 positioned opposite from a back side 320. One or more fan-out blocks 322 are mounted to the module main body 302 at a location behind the back side 320 of the front panel 316. One or more parking blocks 324 are mounted to the front side 318 of the front panel 316. The parking blocks 324 can also be referred to as connector storage sub-modules. The fan-out blocks 322 and the parking blocks 324 are adapted to support and manage various portions of a fiber optic cable assembly 326. The fiber optic cable assembly 326 includes a first end 328 having the ruggedized multi-fiber connector 500b (e.g., a 12 fiber connector) and a second end 330 having a plurality of single fiber connectors 332 that are managed/stored at the parking blocks 324. The fiber optic cable assembly 326 also includes a segment of ruggedized cable 334 that extends from the ruggedized multi-fiber connector 500b to the fan-out block 322.

The fiber optic cable assembly 326 further includes a plurality (e.g., twelve) of segments of pigtail cable 336 that extend from the fan-out blocks 322 to the single fiber connectors 332. The fiber optic cable assembly 326 additionally includes a plurality of separate optical fibers 511' that extend continuously in an uninterrupted manner from multi-fiber connector 500b, through the segment of ruggedized cable 334, the fan-out block 322 and the segments of pigtail cable 336 to the single fiber connectors 332.

The multi-fiber connectors 500a, 500b are shown at FIGS. 12 and 13. The connector 500a can be sized and shaped to interface with the second connector 500b without an intermediate fiber optic adapter. For example, the first connector 500a can define a plug and the second example connector 500b can define a receptacle that is configured to receive the plug. In some implementations, the plug and receptacle are threaded together. In accordance with other aspects of the present disclosure, other types of connectors (e.g., non-ruggedized MPO/MFC connectors could be used).

The connector plug 500a includes a ferrule 510 at which one or more optical fibers 511 of the cable 204 are terminated. In some implementations, the ferrule 510 terminates multiple (e.g., two, eight, twelve, sixteen, twenty-four, forty-eight, seventy-two, etc.) optical fibers 511. In the example shown, the ferrule 510 terminates twelve optical fibers 511. The ferrule 510 defines keying openings 512 at either side of the optical fibers 511. The ferrule 510 is enclosed within a shroud 514 that defines keying and latching features. The shroud 514 and ferrule 510 extend forwardly of a connector base 515. The shroud 514 extends beyond the ferrule 510. The shroud 514 defines a first keying channel 520 and a second keying channel 522 above and below the ferrule 510, respectively.

The connector receptacle 500b also includes a ferrule 510' at which one or more of the optical fibers 511' of the fiber optic cable assembly 326 are terminated. In some implementations, the ferrule 510' terminates multiple (e.g., two, eight, twelve, sixteen, twenty-four, forty-eight, seventy-two, etc.) optical fibers 511. In the example shown, the ferrule 510' terminates twelve optical fibers 511'. The ferrule 510' defines keying projections 512' at either side of the optical fibers 511'. The projections 512' are configured to be inserted into the keying openings 512 of the plug ferrule 510 to facilitate alignment of the ferrules 510, 510'.

The receptacle ferrule 510' is enclosed within a connector body 515' defines a cavity 514' that is sized and shaped to receive the shroud 514 of the plug 500. The connector base 515' is configured to surround the shroud 514. In some embodiments, the connector base 515' latches, screws, or otherwise secures to the shroud 514 to retain the plug 500 and the receptacle 500' in a mated configuration. A first keying projection 520' and a second keying projection 522' are positioned within the cavity 514' above and below the ferrule 510', respectively. In some implementations, the first and second keying projections 520', 522' have different shapes and/or sizes to facilitate finding the correct orientation of the plug and receptacle.

In some implementations, the connectors 500a, 500b include an environmental seal when interfaced together to protect the ferrules 511, 511' from dust, dirt, or other contaminants. In some implementations, an environmental dust cap can be mounted to the connectors 500a, 500b to protect the ferrules 511, 511' prior to deployment of the connectors 500a, 500b. In other embodiments, the connector 500a can be mounted to the fiber optic cable assembly 326 and the connector 500b can be mounted to the cable 204.

Additional details regarding the example connector plug 500a and receptacle 500b can be found in U.S. Pat. No.

7,264,402 to Theuerkorn et al., issued Sep. 4, 2007, and titled Multi-fiber optic receptacle and plug assembly, the disclosure of which is hereby incorporated by reference herein.

FIG. 10 is a cross-sectional view taken along a cross-section line cut through the segment of ruggedized cable 334. The ruggedized cable 334 includes an outer jacket 350 having a flattened configuration. The profile of the outer jacket 350 (shown at FIG. 10) defines a major axis A1 and a minor axis A2. The profile of the outer jacket 350 has a dimension d1 that extends along the major axis A1 and a dimension d2 that extends along the minor axis A2. The dimension d1 is larger than the dimension d2 such that the profile is elongated along the major axis A1. The ruggedized cable 334 includes a central buffer tube 352 containing the optical fibers 511'. The ruggedized cable 334 also includes reinforcing members 354 positioned on the major axis A1 on opposite sides of the buffer tube 352. In one embodiment, the reinforcing members 354 are reinforcing rods including fiber glass embedded in an epoxy matrix. First ends of the reinforcing members 354 are anchored (e.g., adhesively bonded, crimped, etc.) to the housing of the connector 500b and opposite second ends of the reinforcing members 354 are anchored (e.g., adhesively bonded, crimped, etc.) to one of the fan-out block 322.

FIG. 11 is a cross-sectional view taken along a cross-section line cut through one of the segments of pigtail cable 336. The pigtail cable 336 includes an outer jacket 360 having a round configuration. In one embodiment, the outer jacket 360 has an outer diameter less than or equal to 2 millimeters. The pigtail cable 336 also includes an optional buffer tube 362 (e.g., a loose or tight 900 micron diameter buffer tube) containing one of the optical fibers 511'. A layer of flexible strength members 364 (e.g., aramid yarn) is provided between the buffer tube 362 and the outer jacket 360. First ends of the strength members 364 are anchored (e.g., adhesively bonded, crimped, etc.) to one of the fan-out blocks 322 and second ends of the strength members 364 are anchored (e.g., adhesively bonded, crimped, etc.) to the housing of the corresponding single fiber connector 332.

The fan-out blocks 322 are mounted (e.g., attached with fasteners or other means) to the module main body 302. The fan-out block 322 functions to anchor the second end of the ruggedized cable 334 and the first ends of the pigtail cables 336 to the module main body 302. The fan-out block 322 also functions to fan-out (e.g., guide, direct, separate, etc.) the fibers 511' from the buffer tube of the ruggedized cable 334 to the individual pigtail cables 336.

Referring back to FIGS. 2-4, the front panel 316 of the module main body 302 defines one or more cable pass-through openings 370 that extends through the front panel 316 in a back-to-front direction. One or more strain relief boots 372 are mounted to the front side 318 of the front panel 316. The boots 372 project forwardly from the front side 318 of the front panel 316 and each include a passage 374 that aligns with a corresponding one of the cable pass-through openings 370. The pigtail cables 336 are routed forwardly from the fan-out blocks 322 through the cable pass-through openings 370 and the boots 372 to the front of the front panel 316. The pigtail cables 336 are then routed to the parking blocks 324 at the front side of the front panel 316 where the single fiber connectors 332 are held. Each boot 372 receives a plurality of the pigtail cables 336 and has a flexible configuration adapted for distributing side loading across an extended length to protect the fibers 511' from being bent to sharply when the pigtail cables 336 are pulled downwardly, upwardly or laterally relative to the module main body 302.

Figure 14:
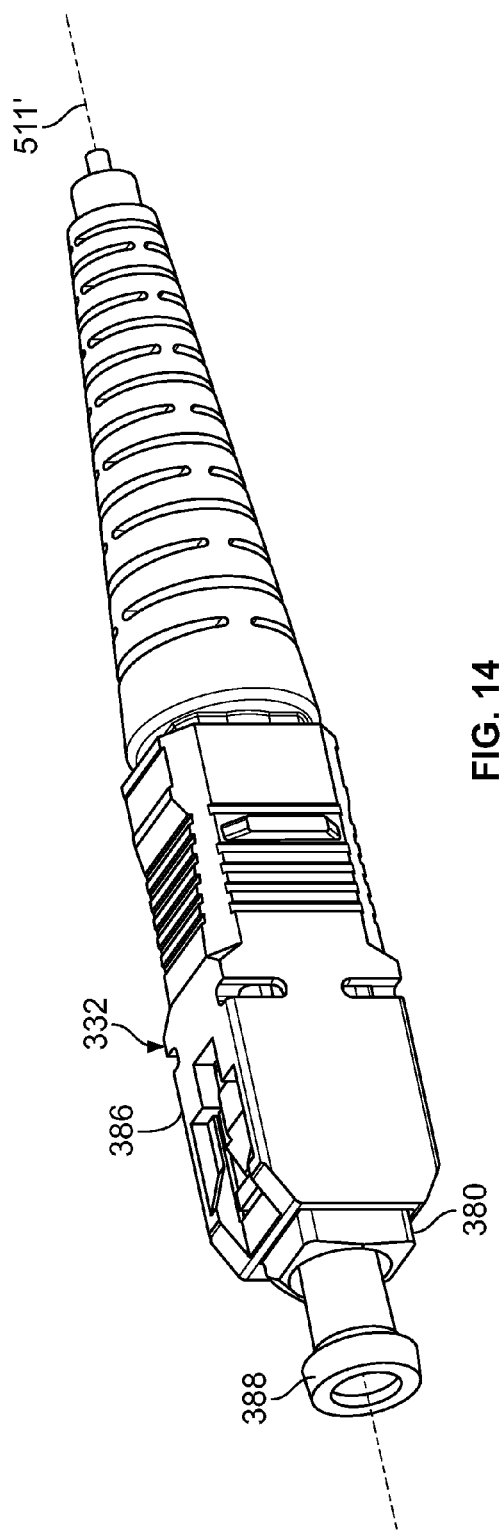
FIG. 14 is a perspective view of a fiber optic connector having a ferrule on which a dust cap is mounted.
Figure 15:
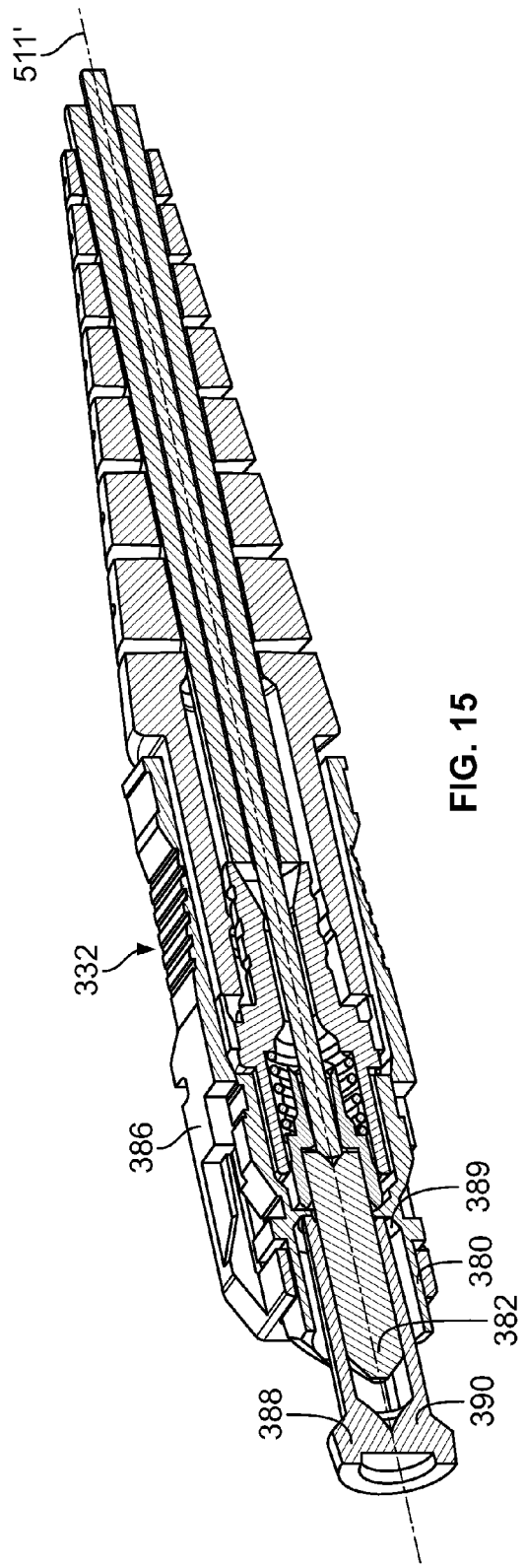
FIG. 15 is a cross-sectional view of the fiber optic connector taken along a cross-sectional plane that extends along a central longitudinal axis of the fiber optic connector and that bisects the fiber optic connector.

FIGS. 14 and 15 show one of the single fiber connectors 332 which is depicted as a standard SC style connector. The single fiber connector 332 includes an inner housing 380 supporting a cylindrical ferrule 382 supporting the end of one of the fibers 511'. The ferrule defines an axis 384 and is movable relative to the inner housing 380 along the axis 384. The ferrule 382 is spring biased relative to the inner housing 380 toward an outer axial position. The single fiber connector 332 also includes an outer release sleeve 386 (e.g., a grip housing) that is mounted over the inner housing 380. The outer release sleeve 386 is moveable relative to the inner housing 380 along the axis 384 and is pulled back relative to the inner housing 380 to release the connector 332 from a standard SC fiber optic adapter.

When the connector 332 is not in use, a polished end face of the ferrule 382 is preferably protected by a dust cap 388. The dust cap 388 is generally cylindrical and includes an open end 389 positioned opposite from a closed end 390. The open end 389 fits over the ferrule 382 such that an end portion of the ferrule is received within the dust cap 388 with the polished end face opposing the closed end 390 of the dust cap 388. The dust cap 388 is secured to the ferrule 382 by a friction fit with an inner surface of the dust cap 388 engaging a circumference of the ferrule 382 such that a circumferential seal is formed between the ferrule 382 and a side wall of the dust cap 388.

The parking blocks 324 can be secured to the front panel 316 by releasable connections that allow the parking blocks to easily be connected and disconnected from the front panel 316 while the connectors 332 are concurrently held by the connector blocks 324. In the depicted embodiment, the parking blocks 324 can be connected to the front panel 316 by snap-fit connections. For example, the parking blocks 324 can include latches and/or tabs that snap within corresponding openings defined by the front panel 316. Example parking systems suitable for use in the system disclosed herein are disclosed in U.S. Pat. Nos. 7,198,409; 7,277,620; and 7,233,731, which are hereby incorporated by reference in their entireties.

Figure 2:
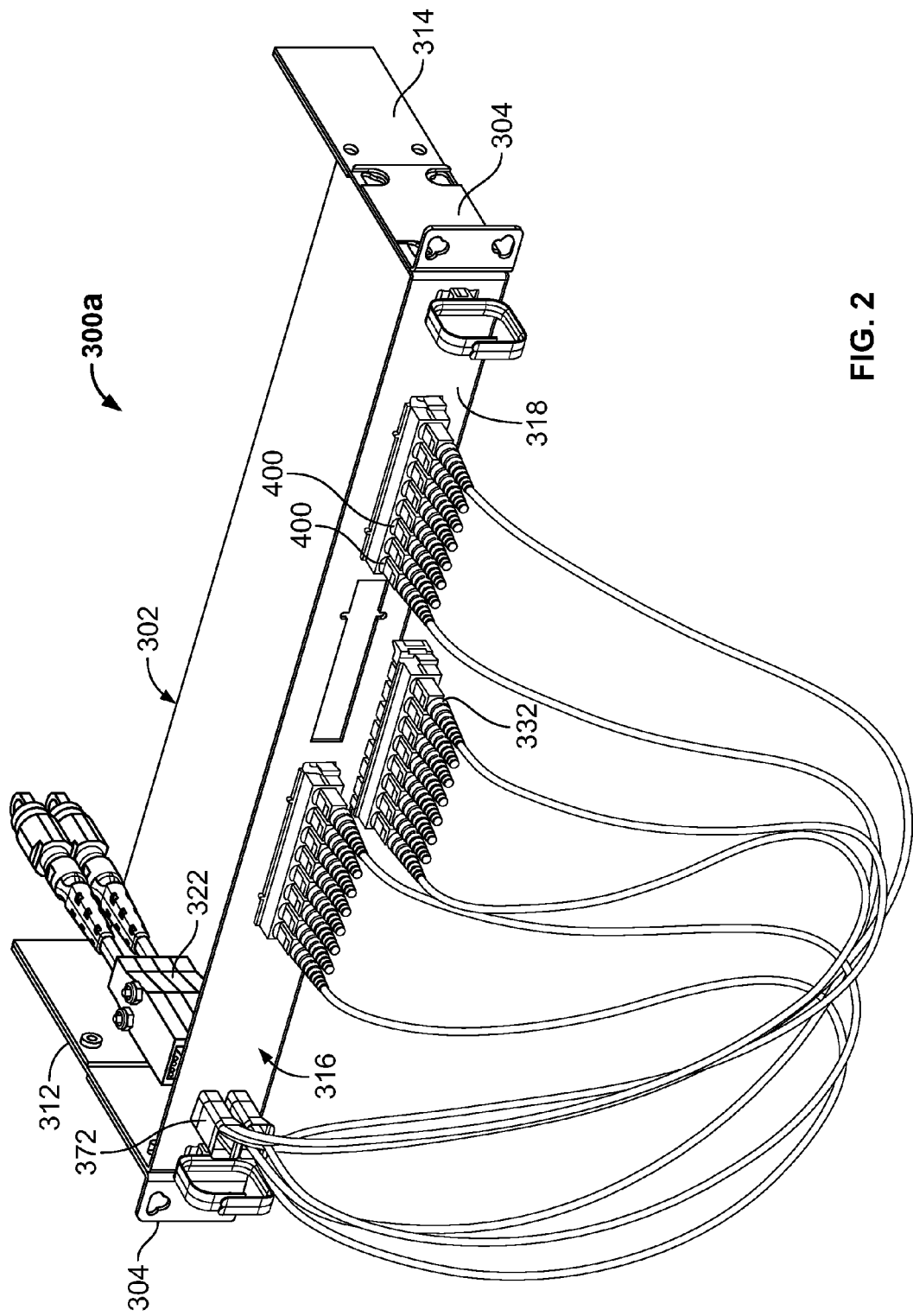
FIG. 2 is a front perspective view of a fan-out and parking module in accordance with the principles of the present disclosure.
Figure 3:
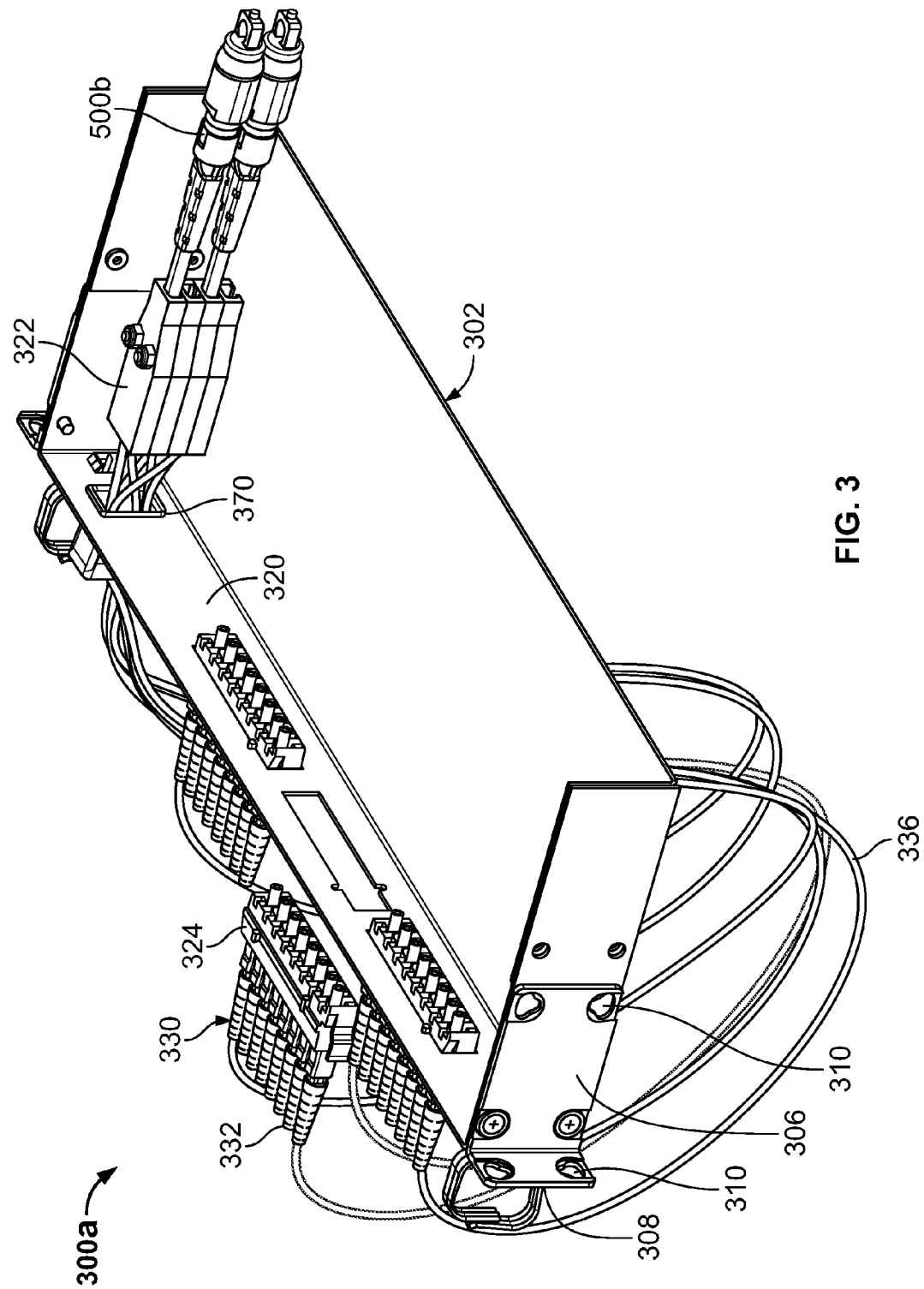
FIG. 3 is a rear perspective view of the fan-out and parking module of FIG. 2.
Figure 4:
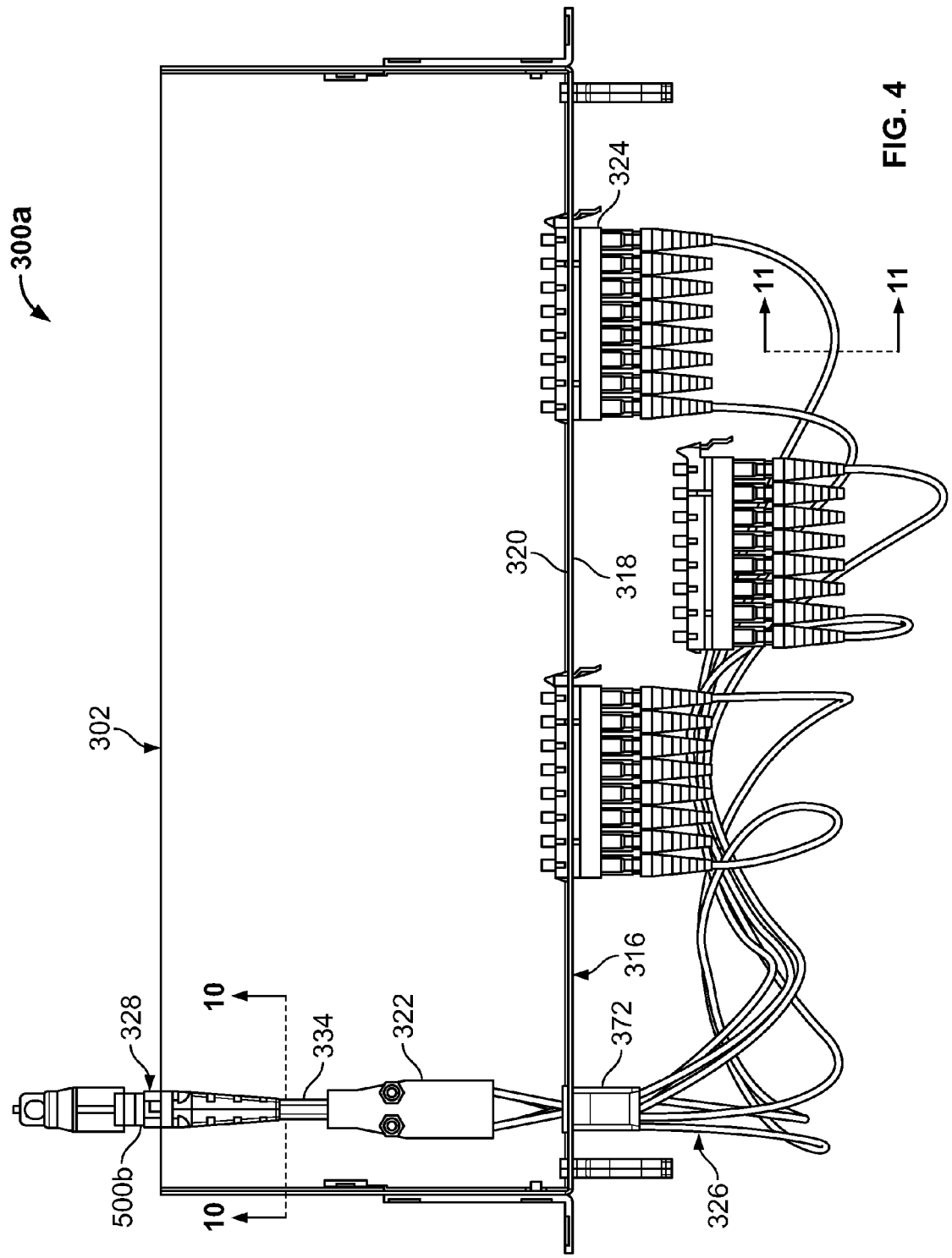
FIG. 4 is a top view of the fan-out and parking module of FIG. 2.

The parking blocks 324 each include a plurality of connector holders 400 each adapted for holding one of the fiber optic connectors 332. In a preferred embodiment, the dust caps 388 remain on the ferrules 382 of the connectors 332 while the connectors are being held by the connector holders 400. In a preferred embodiment, the connector holders 400 are not fiber optic adapters and are not capable of optically connecting two of the fiber optic connectors 332 together. As shown at FIG. 2, the connector holders 400 hold the connectors 332 such that boots of the connectors 332 project outwardly from the front panel 316 at least partially in a forward direction. In one embodiment, the connector holders 400 hold the connectors 332 with their axes 384 horizontal and perpendicular to the front panel 316.

In use of the fan-out and parking module 300a, the module 300a is mounted to the rack 200 with the connectors 332 stored in the parking blocks 324. The connector 500b is connected to the connector 500a so that the optical fibers 511' of the fiber optic cable assembly 326 are place in communication with the backhaul. To add a subscriber to the network, one of the connectors 332 is removed from its corresponding parking block 324 and the corresponding segment of pigtail cable 336 is routed from the rack 200 to the cabinet 202. At the cabinet 202, the dust cap 388 is removed from the ferrule of the connector 332 and the connector is connected to a piece of equipment (e.g., a multiplexer) on at the cabinet 202. In a preferred embodiment, the segments of pigtail cable 336 are long enough to be routed from the rack 200 to the cabinet 202 without needing any intermediate patch cords. To disconnect a subscriber from the network, the connector 332 corresponding to the subscriber's line can be disconnected from the equipment at the cabinet 202. After the connector 332 has been disconnected from the equipment, the dust cap 388 can be returned to the ferrule and the connector can be plugged back into one of the parking blocks 324 at the fan-out and parking module 300a.

Figure 16B:
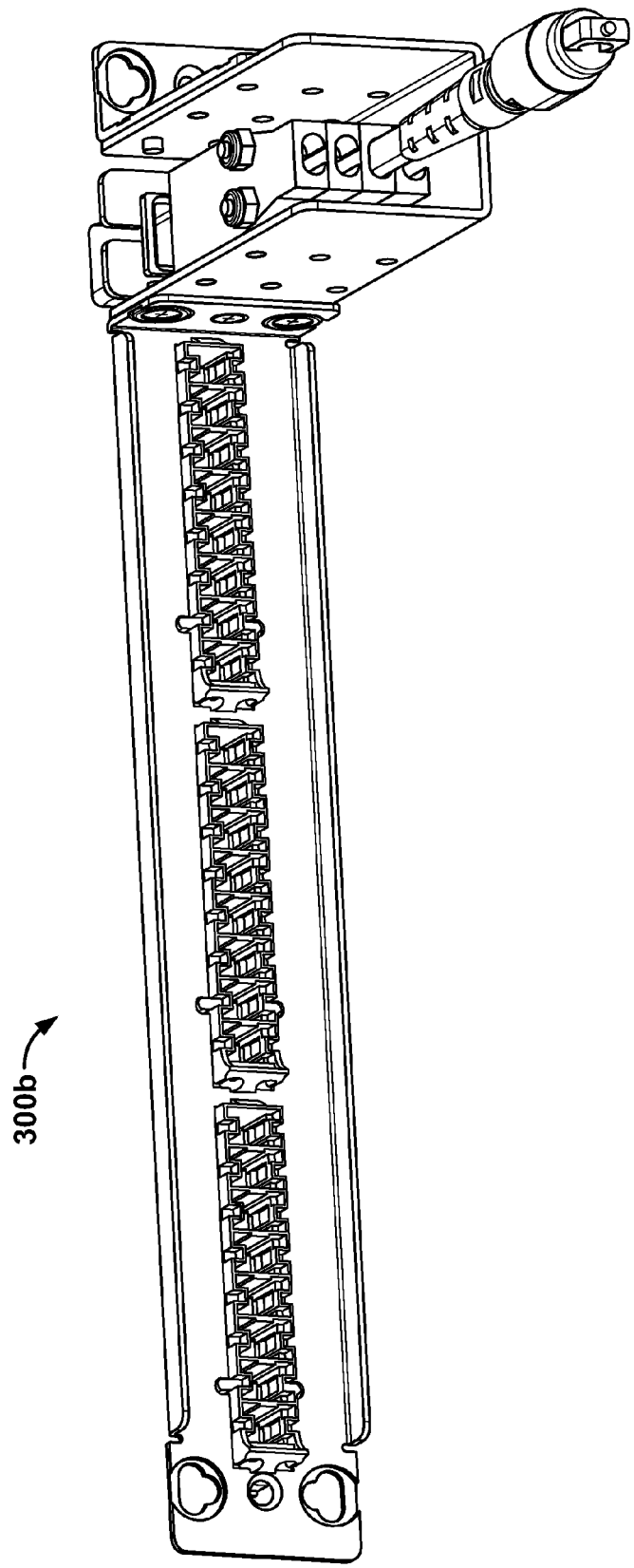

FIGS. 16A and 16B shows an alternative fan-out and parking module 300b in accordance with the principles of the present disclosure. Similar to the fan-out and parking module 300a, the fan-out and parking module 300b includes the fan-out blocks 322, the parking blocks 324 and the fiber optic cable assembly 326 including the multi-fiber connector 500b at one end and a plurality of single fiber connectors 332 at the opposite end. The fan-out and parking module 300b includes a module main body 302' having a U-shaped channel for receiving the fan-out blocks 322. The blocks 322 are mounted in a stacked configuration on a base of the U-shaped channel. A front panel projects laterally outwardly from the U-shaped channel. The parking blocks 324 are mounted to a front side of the front panel.

Figure 18:
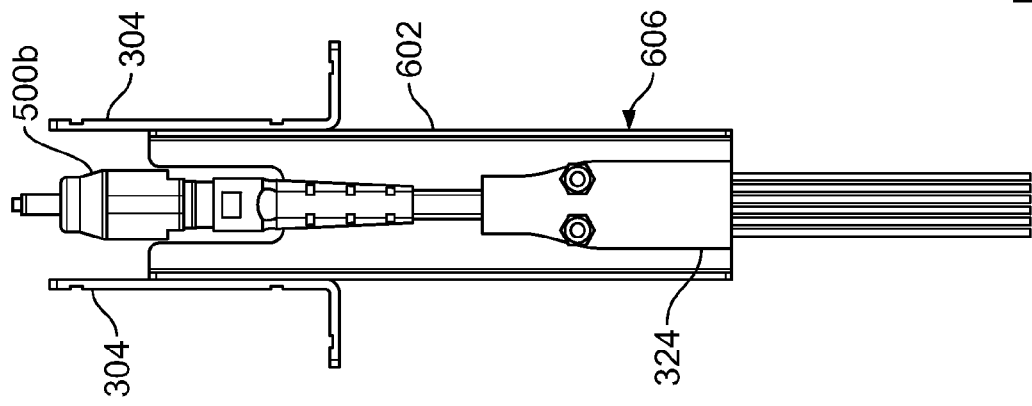
FIG. 18 is another fan-out module in accordance with the principles of the present disclosure.
Figure 17:
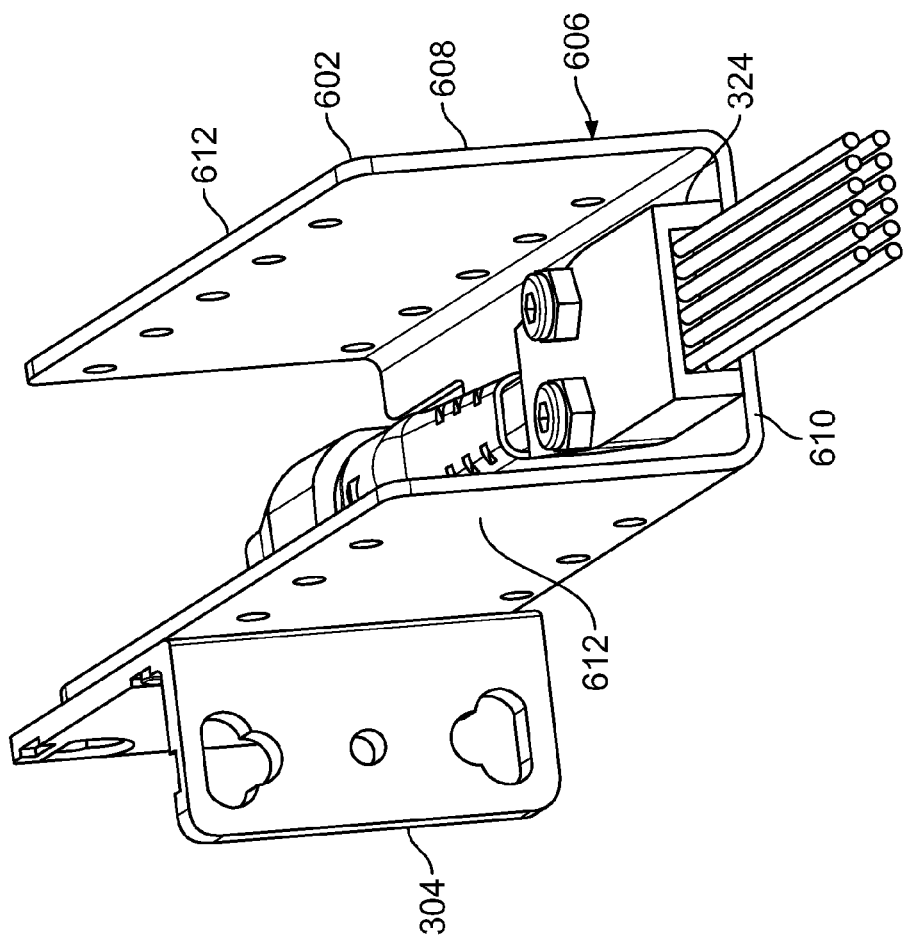
FIG. 17 shows a fan-out module in accordance with the principles of the present disclosure.
Figure 19:
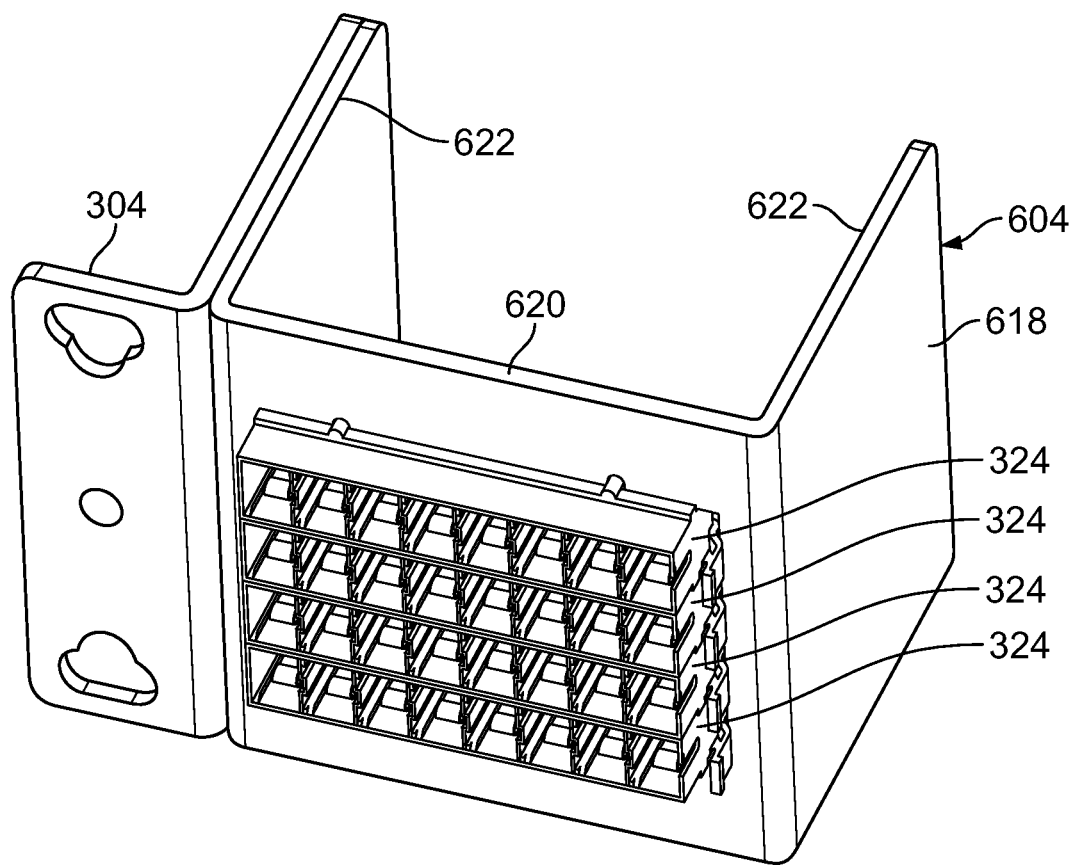
FIG. 19 shows a parking module in accordance with the principles of the present disclosure.

FIGS. 17-19 show another fan-out and parking system 600 in accordance with the principles of the present disclosure. The system 600 includes a fan-out module 602 (FIG. 17 or 18) that is used in combination with a separate parking module 604 (FIG. 19). The fan-out module 602 and the parking module 604 are both adapted for connection to a rack 200 and preferably have a height less than or equal to one rack unit. The fan-out module 602 includes a main module body 606 in the form of a channel member 608 having a U-shaped transverse cross-sectional shape. A width of the fan-out module is less than the width W of the rack 200. The channel member 608 includes a base portion 610 and two opposing leg portions 612. One of the universal brackets 304 can be selectively attached to either of the leg portions 612 depending upon which side of the rack it is desired to mount the fan-out module 602. In alternative embodiments, universal brackets 304 can be attached to both leg portions 612 (see FIG. 18). One of the fan-out blocks 622 is fastened to the base portion 610 thereby mechanically coupling the fiber optic cable assembly 326 to the main module body 606. By fastening the main module body 606 to one of the rails of the rack 200 via the universal bracket 304, the fan-out module 602 can be used to mount/secure the fiber optic cable assembly 326 to the rack 200.

The parking module 604 includes a main module body 616 in the form of a channel member 618 having a U-shaped transverse cross-sectional shape. A width of the fan-out module is less than the width W of the rack 200. The channel member 618 includes a base portion 620 and two opposing leg portions 622. One of the universal brackets 304 can be selectively attached to either of the leg portions 622 depending upon which side of the rack it is desired to mount the parking module 604. In alternative embodiments, universal brackets 304 can be attached to both leg portions 622. Parking blocks 624 are detachable mounted to a front face of the base portion 620. By fastening the main module body 616 to one of the rails of the rack 200 adjacent to the fan-out module 602, the parking module 604 can be used to store the connectors 332 of the fiber optic cable assembly 326 corresponding to the fan-out module 602.

Figure 20:
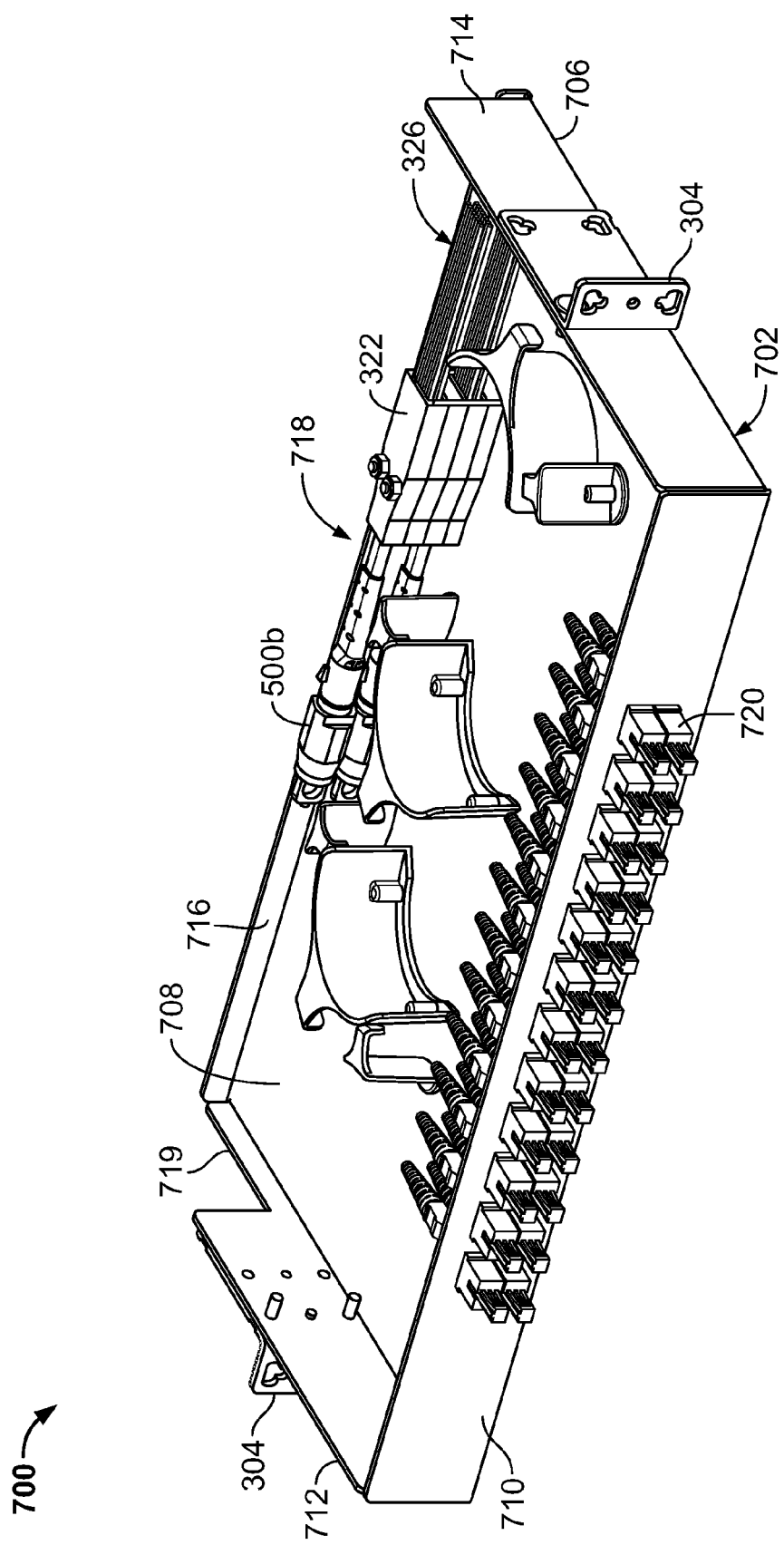
FIG. 20 is a front perspective view of a another fan-out module in accordance with the principles of the present disclosure.
Figure 21:
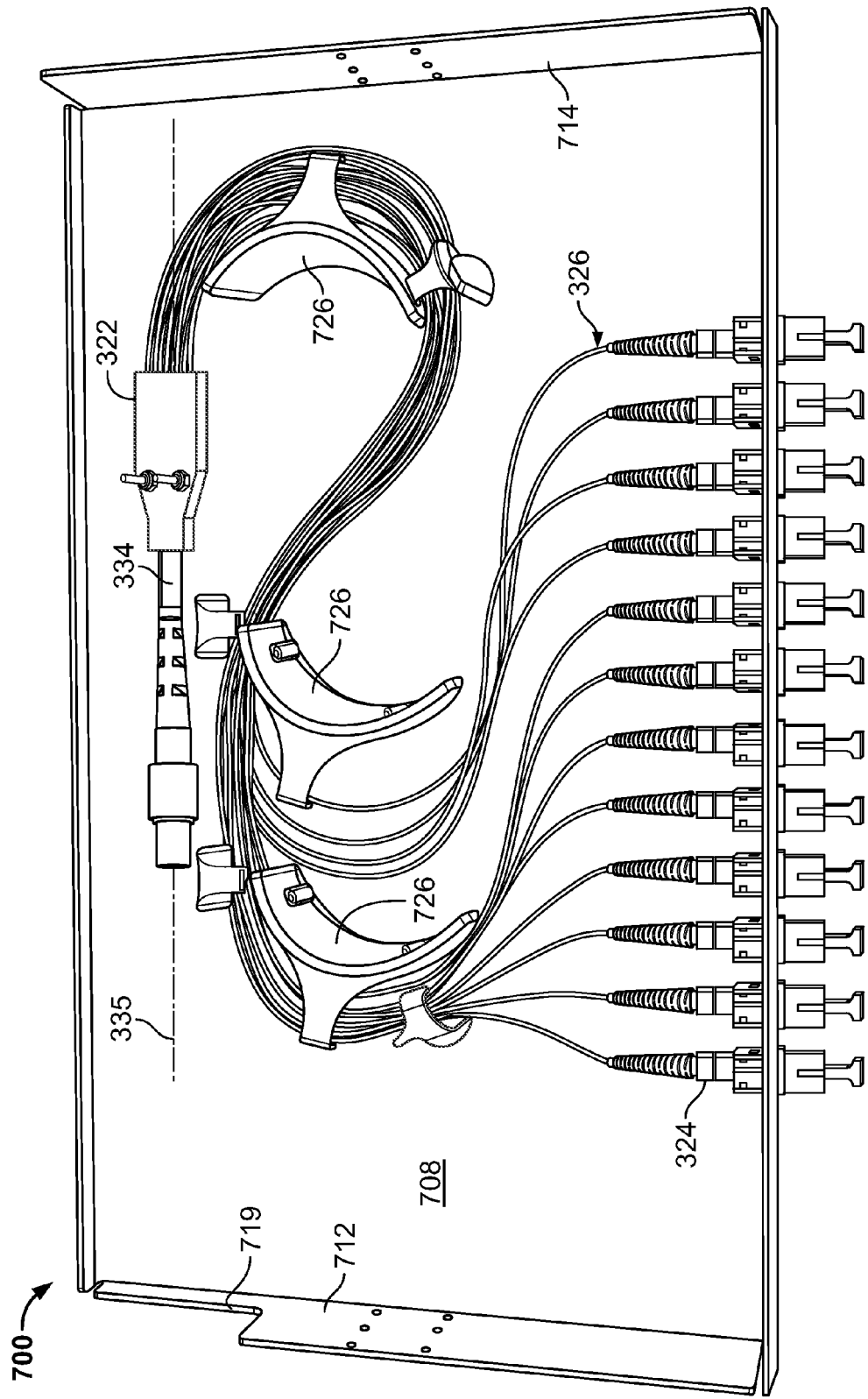
FIG. 21 is a top view of the fan-out module of FIG. 20.

FIGS. 20 and 21 show another fan-out system 700 in accordance with the principles of the present disclosure. The system 700 includes a fan-out module 702 that includes a main module body 706 having a tray-like configuration. The width of the fan-out module 702 corresponds generally to the width W of the rack 200. The main module body 706 includes a bottom wall 708. A front wall 710, opposing side walls 712, 714 and a rear wall 716 project upwardly form the bottom wall 708 and define an interior region 718 of the main module body 706. The side walls 712, 714 extend between the front and rear walls 710, 716. The side wall 712 includes a rear notch 719 forming a rear portion of the side wall 712 which has a reduced height as compared to a front portion of the side wall 712. The rear wall 716 has a reduced height as compared to the front wall 710. The rear portion of the side wall 712 and the rear wall 716 have the same height. Universal brackets 304 are attached to the side walls 712, 714 for allowing the fan-out module 702 to be attached to a rack 200. Two rows of fiber optic adapters 720 are mounted to the front wall 710. The fiber optic adapters 720 include back ports facing rearwardly from a back side of the front wall 710 and front ports facing forwardly from a front side of the front wall 710. Two of the fiber optic cable assemblies 326 are routed on the main module body 706. The fan-out blocks 322 are fastened to the bottom wall 708 within the interior region 718 at a location adjacent the rear wall 716. The fan-out blocks 322 are oriented such that the ruggedized cable segments 334 are aligned along axes 335 that pass through the notch 719 or the rear portion of the side wall 712 positioned beneath the notch 719. The axes 335 are depicted as being substantially/generally parallel (i.e., parallel or almost parallel) to the rear wall 716. The multi-fiber connectors 500b are positioned within the interior region 718 with the lower connector 500b supported on the bottom wall 708. The pigtail cable segments 336 can be routed around bend radius limiters 726 or other cable management structures mounted to the bottom wall 708. The connectors 332 can be inserted into the rear ports of the fiber optic adapters 720. Patch cords can be plugged into the front ports of the fiber optic adapters 720 and used to connect the fiber optic cable assemblies 326 to equipment at the cabinet 202.

As used herein, equipment mounting structure means frames, racks, cabinets or other structures to which telecommunications equipment can be mounted.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A telecommunications apparatus comprising:
   a fan-out module main body adapted for connection to a rack;
   a fan-out block attached to the fan-out module main body;
   a multi-fiber cable segment including a jacket having an elongate transverse cross-sectional profile defining a major axis and a minor axis, the multi-fiber cable segment including a central region at which a plurality of optical fibers are positioned, the central region being positioned at an intersection between the major and minor axes, the multi-fiber cable segment including first and second strength members positioned along the major axis on opposite sides of the central region, the first and second strength members being anchored to the fan-out block;
   a plurality of pigtail cable segments each including a jacket containing one of the optical fibers and a plurality of flexible strength members positioned inside the jacket, the flexible strength members of the pigtail cable segments being anchored to the fan-out block, the optical fibers being fanned out from the multi-fiber cable segment to the pigtail cable segments within the fan-out block; and a plurality of single fiber connectors mounted to free ends of the pigtail cable segments.

2. The telecommunications apparatus of claim 1, further comprising a ruggedized multi-fiber connector terminating a free end of the multi-fiber cable section.

3. The telecommunication apparatus of claim 2, wherein the multi-fiber connector is positioned supported above a base wall of the fan-out module main body.

4. The telecommunications apparatus of claim 2, wherein the fan-out module main body includes a U-shaped channel member, and wherein the fan-out block is attached to a base of the U-shaped channel member.

5. The telecommunications apparatus of claim 2, wherein the fan-out module main body includes a tray including a base and a front wall, wherein the fan-out block is attached to the base and a plurality of fiber optic adapters are mounted to the front wall.

6. The telecommunications apparatus of claim 2, wherein the tray defines an interior region and the multi-fiber connector is positioned within the interior region.

7. The telecommunications apparatus of claim 1, further comprising a parking module including a plurality of connector holders for holding the single fiber connectors while end faces of ferrules of the single fiber connectors are protected by dust caps which circumferentially engage the ferrules, the parking module including a parking module main body separate from the fan-out module main body, the parking module main body being adapted for connection to the rack, the connector holders being mounted to the parking module main body.

8. The telecommunications apparatus of claim 7, herein the connector holders are provided on separate parking blocks detachably mounted to the parking module main body, each of the parking blocks including a plurality of the connector holders.

9. A fan-out and parking module comprising:
a module main body adapted for connection to a rack, the module main body including a front wall having a front side and back side;
a fan-out block attached to the fan-out module main body;
a multi-fiber cable segment including a jacket containing a plurality of optical fibers, the multi-fiber cable segment also including at least one strength member anchored to the fan-out block;
a plurality of pigtail cable segments each including a jacket containing one of the optical fibers and at least one strength member positioned inside the jacket, the strength members of the pigtail cable segments being anchored to the fan-out block, the optical fibers being fanned out from the multi-fiber cable segment to the pigtail cable segments within the fan-out block;
a plurality of single fiber connectors mounted to free ends of the pigtail cable segments; and
a plurality of connector holders for holding the single fiber connectors while end faces of ferrules of the single fiber connectors are protected by dust caps which circumferentially engage the ferrules, the connector holders being mounted at the front side of the front wall of the module main body.

10. The fan-out and parking module of claim 9, wherein the connector holders are provided on separate parking blocks detachably mounted to the module main body, each of the parking blocks including a plurality of the connector holders.

11. The fan-out and parking module of claim 9, wherein the fan-out block is attached to the module main body at a location behind the front wall.

12. The fan-out and parking module of claim 11, wherein the front wall defines a cable pass-through opening, and wherein the pigtail cable sections are routed from the fan-out block in a rearward to forward direction through the cable pass-through opening.

13. The fan-out and parking module of claim 12, further comprising a boot projecting forwardly from the front wall at the cable pass-through opening, the pigtail cable sections being routed through the boot.

* * * * *

UNITED STATES PATENT AND TRADEMARK OFFICE
CERTIFICATE OF CORRECTION

PATENT NO. : 8,873,922 B2  
APPLICATION NO. : 13/331591  
DATED : October 28, 2014  
INVENTOR(S) : Scott C. Kowalczyk et al.

Page 1 of 1

It is certified that error appears in the above-identified patent and that said Letters Patent is hereby corrected as shown below:

In the Specification

Column 2, Line 37: "but" should read --hut--.

Column 2, Line 38: "but" should read --hut--.

Column 2, Line 49: "but" should read --hut--.

Column 2, Line 57: "but" should read --hut--.

Signed and Sealed this  
Second Day of May, 2017

Michelle K. Lee  
*Director of the United States Patent and Trademark Office*